United States Patent [19]

Backheim

[11] Patent Number: 4,913,646

[45] Date of Patent: Apr. 3, 1990

[54] COMBUSTION DEVICE

[75] Inventor: Tommy Backheim, Oxie, Sweden

[73] Assignee: Kockums Marine AB, Malmo, Sweden

[21] Appl. No.: 341,966

[22] Filed: Apr. 24, 1989

[30] Foreign Application Priority Data

May 18, 1988 [SE] Sweden ................................ 8801860

[51] Int. Cl.⁴ ............................ F23L 5/10; F23L 5/20
[52] U.S. Cl. ..................................... 431/116; 431/121; 431/182; 239/399
[58] Field of Search .............. 431/115, 116, 121, 181, 431/182, 183, 185; 60/517; 239/106, 399

[56] References Cited

U.S. PATENT DOCUMENTS

| 3,308,870 | 3/1967 | Rex ..................................... 431/121 |
| 3,808,803 | 5/1974 | Salvi .................................. 431/185 X |
| 3,869,244 | 3/1975 | Von Linde et al. ................ 431/116 |
| 4,287,857 | 9/1981 | Schnitzer ........................ 431/116 X |
| 4,345,426 | 8/1982 | Egnell et al. ................... 431/116 X |
| 4,613,299 | 9/1986 | Backheim ............................ 431/116 |

Primary Examiner—Randall L. Green
Attorney, Agent, or Firm—Laurence R. Brown; Alfred J. mangels

[57] ABSTRACT

In a combustion device for burning a liquid atomized fuel with an oxygen containing gas and in which ejectors using oxygen as driving gas are sucking admixed exhaust gases into a space adjacent to a fuel supply nozzle, the inventive feature is to provide guide vanes of spiral shape in the space adjacent to the fuel supply.

5 Claims, 1 Drawing Sheet

COMBUSTION DEVICE

This invention relates to a combustion device in which an atomised, liquid fuel is burned with an oxygen containing gas said device comprising ejector means mounted around a centrally disposed fuel supply nozzle, said ejector means being located in a duct extending from an exhaust space surrounding a combustion chamber located below the fuel injection nozzle and inwards a generally cylindrical space located below and adjacent to the said nozzle and above the combustion chamber, said cylindrical space being limited by walls of a hub carrying a plurality of ejectors using oxygen as driving gas for moving part of the combustion gases into the combustion chamber via said space below the fuel supply nozzle.

A combustion device of the type referred to above has been described e.g. in the Swedish patent specification No. 8403010-5.

Experience has shown that after certain hours of operation the fuel injection nozzle and the walls of the cylindrical space below said nozzle will be covered by deposits caused by impurities in the fuel or by incomplete combustion of the fuel. Hitherto the said problem has not been solved satisfactorily neither by using fuels of higher quality nor by—as shown in the drawing of the above patent specification—inclining the ejectors so as to cause a swirl of oxidizing gas below the fuel supply nozzle.

The object of the present invention is to provide a combustion device of the type referred to above which may be able to use commercial quality fuels during long intervals without problems due to deposits at or near the fuel supply nozzle.

According to the present invention a plurality of guide vanes are arranged in the cylindrical space between the said duct and the said nozzle, said guide vanes extending downwardly and having spiral shape in a plane perpendicular to the axis of said space.

The invention will be described in more detail reference being made to to the drawing in which FIG. 1 is a vertical section through a device according to the prior art.

Figure 1:
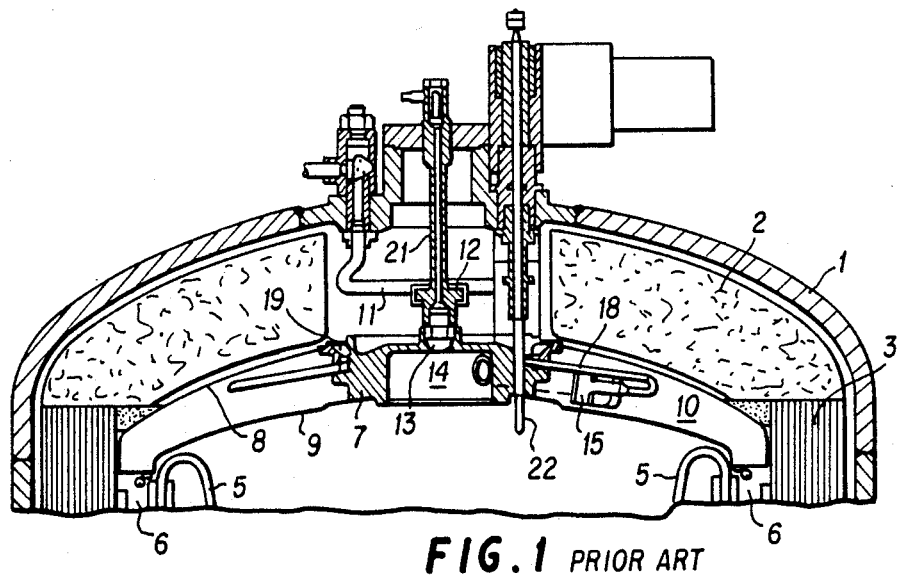

The prior art device shown in FIG. 1 comprises a shell 1 enclosing a volume in which a high pressure—e.g. 3 Mpa—may prevail. Heat insulating material 2 and S will protect the shell 1 and prevent heat losses in case a high temperature prevails in the central part 4 of the volume enclosed by the shell 1.

Said part 4 form a generally rotation symmetrical plenum chamber for the combustion. The combustion chamber 4 is partly limited by heater tubes 5 leaving gaps between them through which the combustion gases formed may leave the chamber 4 and pass into a surrounding annular space 6. Said annular space 6 is connected to an exhaust outlet, not shown. The heater tubes 5 are part of a heat engine—e.g. a Stirling engine—not shown otherwise.

The combustion chamber 4 is also limited by a hub 7 carrying two disc shaped covers 8, 9 leaving a duct 10 between them. The hub 7 is connected to an oxygen supply tube 11 bent through 90 degrees three times making it rather flexible and adapted to withstand thermal stresses the hub 7 has a vertical, central opening 12 adapted to receive a fuel supply nozzle 13. The hub has also a lower, wider bore 14 —forming a cylindrical space communicating with the chamber 4. A number of ejectors 15 deliver fuel into said space 14 as does the nozzle 13. The ejectors are shown best in FIG. 3.

Each ejector 15 comprises a venturi tube 16 having its delivery opening 17 directed off-set from the central vertical axis of the hub 7 so as to produce a swirl in the cylindrical space 14. Oxygen used as a driving gas is supplied through a tube 18 which is bent through 180 degrees and connected to the hub 7. The tube 18 is in connection with an annular oxygen chamber 19 in the hub, said chamber 19 being connected to the tube 11. The ejectors 15 will suck in combustion gases through the rear ends 20 of the venturi tubes 16.

The combustion gases formed in the combustion chamber 4 will pass between the tubes 5 into the annular exhaust space 6 and be cooled off substantially—e.g. from 1400° C. to 800° C.—. Some of the cooled gases will now be sucked into the duct 10 from the exhaust space 6. The construction mainly consisting of the hub 7, the covers 8 and 9 and the ejectors 15 is carried by a long and flexible tube 21 for fuel supply The reference numeral 22 in FIG. 1 designates a retractable heater plug used for ignition during starting up of the combustion device.

Figure 3:
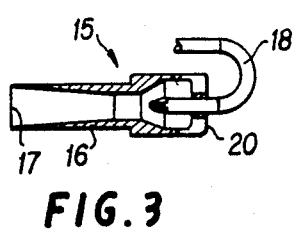
FIG. 3 is a section through an ejector of known design used in the device.

During operation of the known device shown in FIGS. 1 and 3 solid deposits will accumulate on the walls of the cylindrical space 14 adjacent to the fuel supply nozzle 13 and on the fuel nozzle itself. This will occur in spite of the inclined arrangement of the injectors 15 and even if a high quality fuel—e.g. white spirit—is used.

Figure 2:
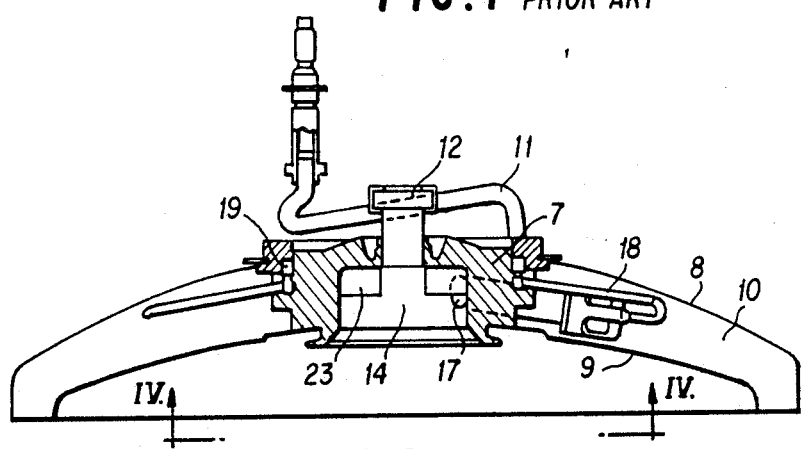
FIG. 2 is a vertical section—at a somewhat larger scale—through a part of a device according to the present invention.
Figure 4:
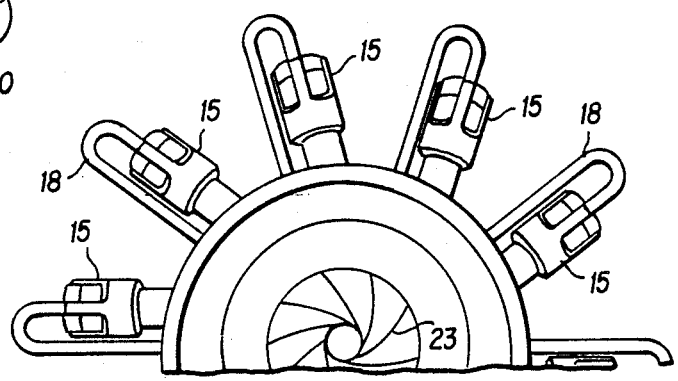
FIG. 4 is a view in the direction IV—IV of FIG. 2.

As shown in FIGS. 2 and 4 and according to the present invention the part of the cylindrical space 14 near the nozzle 13—i.e. the upper part thereof—has been provided with spirally shaped guide vanes 23 extending downwardly from the upper end wall limiting the space 14. In a plane perpendicular to the central vertical axis of the combustion chamber and of the cylindrical space 14 the vanes extend spirally from the delivery openings 17 to the location of the fuel injection nozzle 13.

The number of guide vanes should preferably be equal to the number of ejectors 15.

The vertical dimension of the vanes should be sufficient to overlap about 80% of the diameter of the openings 17.

Practical tests have shown that a combustion device according to the invention may have intervals longer than 3000 hours between services without formation of deposits near the fuel nozzle. Said results have been obtained with diesel fuel oil of normal quality.

Combustion devices of prior design—i.e. without the provision of the guide vanes 23—have been unable to run during longer intervals than about 10 to 20 hours due to formation of residues adjacent to the nozzle 13.

The combustion during all said intervals has been performed under elevated pressure varying between 1 and 3 MPa.

I claim:

1. A combustion device in which an atomized liquid fuel is burned with an oxygen containing gas said device comprising ejector means mounted around a centrally disposed fuel nozzle, said ejector means being located in a duct extending from an exhaust space surrounding a combustion chamber located below the fuel supply nozzle and towards a generally cylindrical space located below and adjacent to the said nozzle and above the combustion chamber, said cylindrical space being limited by walls of a hub carrying a plurality of ejectors for supplying oxygen as driving gas for moving part of the combustion gases into the combustion chamber via said space below the fuel supply nozzle characterized in that said ejectors are coupled to said cylindrical space by means of delivery openings circumferentially arranged about the cylindrical space, and a plurality of guide vanes are arranged in the cylindrical space between the said duct and the said nozzle to direct the flow of driving gas from said ejectors, said guide vanes extending downwardly and having spiral shape in a plane perpendicular to the axis of said space to extend away from the delivery openings.

2. A combustion device according to claim 1 in that the combustion device is mounted in a shell adapted to retain high pressure combustion conditions within the range of 1 and 3 MPa.

3. A combustion device according to claim 1 further characterized in that: the number of guide vanes is equal to the number of delivery openings.

4. A combustion device according to claim 1 further characterized in that: the guide vanes extend downwardly into said cylindrical space to overlap substantially half of said delivery openings.

5. A heat engine in which an atomized liquid fuel is burned with an oxygen containing gas comprising in combination, a fuel supply nozzle directing fuel along an axial path, a combustion chamber positioned along said path, receiving fuel from said nozzle in which heat exchange pipes for the engine are located, hub means surrounding the nozzle and path positioned between the nozzle and combustion chamber defining a substantially cylindrical space in which fuel and oxygen containing gas is mixed, a plurality of ejectors for supplying said oxygen contain gas as a driving gas located circumferentially in walls about said cylindrical space with delivery openings directed into said space at angles for producing a swirl in said space, and a plurality of guide vanes located in said space and distributed about said nozzle to extend toward the combustion chamber in a spiral shape at locations covering a portion of the delivery openings of the ejectors.

whereby solid deposits accumulating on the walls about said cylindrical space are reduced.

* * * * *